(12) United States Patent
Burka et al.

(10) Patent No.: US 8,688,754 B1
(45) Date of Patent: Apr. 1, 2014

(54) REMEMBERED SET OVERHEAD REDUCTION BY DEFERRED GARBAGE COLLECTIONS OF STABLE REGIONS

(71) Applicant: International Business Machines Corporation, Armonk, NY (US)

(72) Inventors: Peter W. Burka, Ottawa (CA); Aleksandar Micic, Ottawa (CA); Ryan A. Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/622,691

(22) Filed: Sep. 19, 2012

(51) Int. Cl.
*G06F 12/00* (2006.01)
*G06F 17/30* (2006.01)
*G06F 12/02* (2006.01)

(52) U.S. Cl.
CPC ................................... *G06F 12/0253* (2013.01)
USPC ........................................... 707/813; 711/159

(58) Field of Classification Search
None
See application file for complete search history.

(56) References Cited

U.S. PATENT DOCUMENTS

| | | | |
|---|---|---|---|
| 4,775,932 A * | 10/1988 | Oxley et al. ........................... | 1/1 |
| 5,088,036 A | 2/1992 | Ellis et al. | |
| 5,485,613 A | 1/1996 | Engelstad et al. | |
| 5,900,001 A | 5/1999 | Wolczko et al. | |
| 6,185,581 B1 | 2/2001 | Garthwaite | |
| 6,493,730 B1 | 12/2002 | Lewis et al. | |
| 7,293,051 B1 | 11/2007 | Printezis et al. | |
| 7,340,494 B1 | 3/2008 | Detlefs et al. | |
| 7,412,580 B1 | 8/2008 | Garthwaite | |
| 7,539,837 B1 | 5/2009 | Flood et al. | |
| 7,617,264 B1 | 11/2009 | Garthwaite | |
| 7,650,350 B1 | 1/2010 | Garthwaite | |
| 2002/0161792 A1 | 10/2002 | Garthwaite | |
| 2008/0279005 A1* | 11/2008 | France ..................... | 365/185.11 |
| 2009/0112952 A1* | 4/2009 | Adams et al. ................ | 707/206 |
| 2010/0179971 A1* | 7/2010 | Petrank et al. ................ | 707/818 |
| 2010/0185703 A1 | 7/2010 | Ylonen | |

OTHER PUBLICATIONS

Hudson, et al.; "Incremental collection of mature objects"; Springer Berlin Heidelberg; Lecture Notes in Computer Science, vol. 637, 1992; pp. 388-403.*
Sachindran, et al.; "MC2: High-Performance Garbage Collection for Memory-Constrained Environments"; ACM SIGPLAN Notices; vol. 39, Issue 10, Oct. 2004; pp. 81-98.*
James Kovacs, Identify and Prevent Memory Leaks in Managed Code, Journal: MSDN Magazine, Jan. 2007, pp. 1-8, Microsoft Corporation, Published at: http://msdn.microsoft.com/en-us/magazine/cc163491.aspx.

(Continued)

*Primary Examiner* — Tony Mahmoudi
*Assistant Examiner* — Umar Mian
(74) *Attorney, Agent, or Firm* — Lee Law, PLLC; Christopher B. Lee

(57) ABSTRACT

At least one region of a heap that includes memory allocations is analyzed, using age and occupancy criteria, across a number of local garbage collection cycles using a processor executing a region-based garbage collector. Based upon the analyzed age and occupancy criteria of the at least one region, at least one stable region in age and occupancy is identified among the at least one region of the heap across the number of local garbage collection cycles. Maintenance of a remembered set (RS) of external references into the at least one stable region is temporarily stopped for each identified stable region during at least one additional local garbage collection cycle.

12 Claims, 8 Drawing Sheets

(56) References Cited

OTHER PUBLICATIONS

Andreas Steiner, et al., IBM JVM 1.4.2 64-Bit in SAP NetWeaver Application Server Java Environments, Technical Article, Mar. 25, 2010, pp. 1-42, IBM Corporation, Boeblingen, Germany.

David Detlefs, et al., Garbage-First Garbage Collection, Proceedings of the Fourth International Symposium on Memory Management, Oct. 24-24, 2004, pp. 37-48, Sun Microsystems, Inc., Association for Computing Machinery (ACM), Vancouver, British Columbia, Canada.

David Ungar, Generational Scavenging: A Non-disruptive High Performance Storage Reclamation Algorithm, Proceedings of the First ACM SIGSOFT/SIGPLAN Software Engineering Symposium on Practical Software Development Environments, May 1984, pp. 157-167, Association for Computing Machinery (ACM), New York, NY, USA.

Patrick Sonntag, State of the Art Garbage Collection, Article, Apr. 29, 2009, pp. 1-12, BA Stuttgart, Published at: http://files.sonntaghome.net/State% 20of%20the%20Art%-%20Garbage%20Collection.pdf.

David Detlefs, et al., Concurrent Remembered Set Refinement in Generational Garbage Collection, Proceedings of the 2002 USENIX Java(TM) Virtual Machine Research and Technology Symposium, Aug. 1-2, 2002, pp. 1-14, San Francisco, CA, USA.

Anthony Hosking, et al., Remembered Sets Can Also Play Cards, Proceedings of the OOPSLA'93 Workshop on Garbage Collection and Memory Management, 1993, 1-8, Published at: http://citeseerx.ist.psu.edu/viewdoc/summary?doi=10.1.1.45.8594.

Alain Azagury, et al., Combining Card Marking with Remembered Sets: How to Save Scanning Time, Proceedings of the 1st International Symposium on Memory Management, ISMM '98, 1998, pp. 10-19, Association for Computing Machinery (ACM), New York, NY, USA.

\* cited by examiner

US 8,688,754 B1

REMEMBERED SET OVERHEAD REDUCTION BY DEFERRED GARBAGE COLLECTIONS OF STABLE REGIONS

RELATED APPLICATIONS

This application is related to U.S. patent application Ser. No. 13/153,402, titled "EFFICIENT REMEMBERED SET FOR REGION-BASED GARBAGE COLLECTORS," which was filed in the United States Patent and Trademark Office on Jun. 4, 2011, and which is incorporated herein by reference in its entirety.

BACKGROUND

The present invention relates to memory garbage collection. More particularly, the present invention relates to remembered set overhead reduction by deferred garbage collection of stable regions.

Garbage collection in computing technology refers to a technique that is used to identify allocated memory within a system that is no longer used by a process. Identified unused memory allocations may be reclaimed by garbage collection processing and the reclaimed memory may be reused for future memory allocations.

BRIEF SUMMARY

A method includes analyzing, using age and occupancy criteria, across a plurality of local garbage collection cycles via a processor executing a region-based garbage collector, at least one region of a heap that comprises memory allocations; identifying, based upon the analyzed age and occupancy criteria of the at least one region, at least one stable region in age and occupancy among the at least one region of the heap across the plurality of local garbage collection cycles; and temporarily stopping, for each identified at least one stable region during at least one additional local garbage collection cycle, maintenance of a remembered set (RS) of external references into the at least one stable region.

A system includes a memory and a processor that executes a region-based garbage collector and is programmed to: analyze, using age and occupancy criteria, across a plurality of local garbage collection cycles, at least one region of a heap within the memory that comprises memory allocations; identify, based upon the analyzed age and occupancy criteria of the at least one region, at least one stable region in age and occupancy among the at least one region of the heap across the plurality of local garbage collection cycles; and temporarily stop, for each identified at least one stable region during at least one additional local garbage collection cycle, maintenance of a remembered set (RS) of external references into the at least one stable region.

A computer program product includes a computer readable storage medium having computer readable program code embodied therewith, where the computer readable program code when executed on a computer causes the computer to execute a region-based garbage collector and to: analyze, using age and occupancy criteria, across a plurality of local garbage collection cycles, at least one region of a heap that comprises memory allocations; identify, based upon the analyzed age and occupancy criteria of the at least one region, at least one stable region in age and occupancy among the at least one region of the heap across the plurality of local garbage collection cycles; and temporarily stop, for each identified at least one stable region during at least one additional local garbage collection cycle, maintenance of a remembered set (RS) of external references into the at least one stable region.

DETAILED DESCRIPTION

Figure 1:
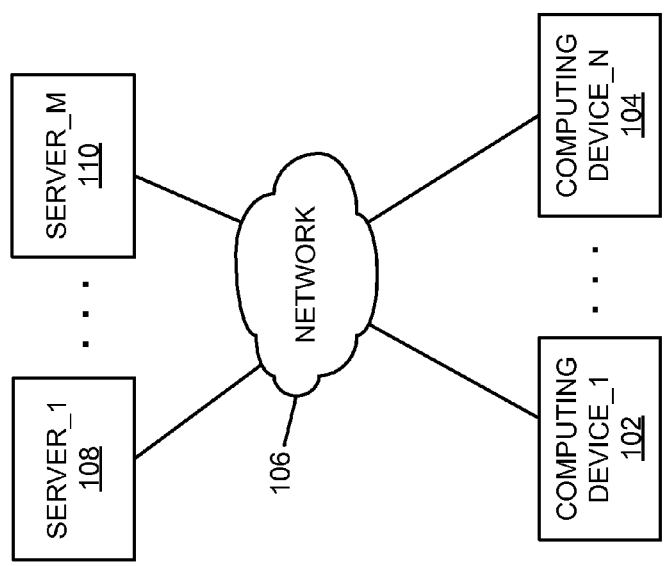
FIG. 1 is a block diagram of an example of an implementation of a system for remembered set overhead reduction by deferred garbage collection of stable regions according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides remembered set overhead reduction by deferred garbage collection of stable regions. Memory regions (alternatively "regions" herein) may be determined to be "stable" regions. Subject to variations and refinements as described in detail below, an example criterion for designation of a region as a stable region may include a determination of a high projected survival rate for a region (e.g., a very old region). An additional/alternative criterion for designation of a region as a stable region may include a determination that the region has a high occupancy (e.g., full within a statistical deviation). Additional and/or alternative stability criteria are possible and all are considered within the scope of the present subject matter. Once a region has been identified/designated as a stable region, the frequency of maintenance of a remembered set (RS) for the stable region may be reduced relative to other regions by deferring local garbage collection cycles for the stable region until an appropriate time for rebuilding of the RS. For example, the remembered set for a stable region may be placed into an overflowed state and any further partial garbage collection (PGC) updates to and operations on the remembered set may be ignored, rather than adding any new references or removing old or duplicate references at each PGC. The stable region may be subject to a next global marking phase (GMP) and sweep cycle of a global garbage collection cycle, which may identify potential garbage that accumulated during past deferred PGCs. As such, the global garbage collection cycle illustrates one example boundary at which the RS for the region may be rebuilt, such that after the GMP completes, all regions will again have an accurate RS. However, it should be understood that other events and/or boundaries may be used to designate rebuilding of the RS as appropriate for a given implementation. After the RS for the stable region is rebuilt, the region may again be considered for garbage collection, including PGCs. If enough garbage is created, the region may be subjected to de-fragmentation by the next few PGCs. If not sufficiently fragmented or in response to completion of de-fragmentation, the region may be evaluated for stability again. The processing may continue (e.g., RS overflowed and rebuilt) an unlimited number of times. As such, by deferring garbage collection of stable regions, remembered set overhead may be reduced.

By updating remembered sets for stable regions only at the GMP level (or other boundary as appropriate for a given implementation) rather than at the PGC level, the overall remembered set processing overhead for workloads with larger percentages of permanent or slowly changing live sets may be significantly reduced. As such, once a region is designated as stable, the frequency of updates and consequently the associated cost of resource consumption and time to maintain a concise and accurate remembered set (RS) for the stable region may be considerably reduced.

It should be noted that conception of the present subject matter resulted from recognition of certain limitations associated with garbage collection technology. For example, it was observed that a region-based garbage collector divides an object heap into a number of equally-sized regions. It was further observed that in a region-based collector, the collector must be able to perform operations on arbitrary groups of regions, called "collection sets." It was observed that to do this form of grouping, it is necessary to find and document references from other regions into the collection set, and that this information is called a "remembered set" (RS). It was observed that a remembered set is maintained locally for each region to document/remember references originating from outside of the region that point to objects inside of the region. Additionally, it was observed that a positive feedback loop exists for local garbage collection cycles (local GCs) within region-based garbage collection. It was observed that, as more remembered references (within remembered sets) become stale, these stale references create more garbage, and more garbage creates more stale remembered references, thereby creating a positive feedback loop for the creation of garbage. Consequently, it was determined that global garbage collection cycles (global GCs) are more effective on older regions because global garbage collection cycles generally create less floating garbage than local garbage collection cycles. It was additionally determined that the overhead in both memory footprint and time required to maintain a precise remembered set for a region-based collector may be significant, such as for example for invalidation of old entries and detection of duplicate entries. In view of these observations and determinations, it was further determined that workloads that have a large base of permanent objects will have regions that are not candidates to be reclaimed during a partial garbage collection (PGC) cycle. It was further determined that maintaining a precise remembered set for such "stable regions" between global garbage collection cycles is unnecessary and remembered set maintenance may be relaxed in either of the space or time domains. The present subject matter improves remembered set overhead and maintenance by deferring garbage collection of stable regions, as described above and in more detail below. As such, improved remembered set overhead and processing may be obtained by use of the present technology.

To provide a foundation for the examples that follow, several definitional concepts and definitions will be described. As referenced above, a "remembered set" represents a collection of information that documents references from other regions into a collection set (e.g., grouping of regions). Additionally, for purposes of the examples that follow, it will be assumed that garbage collections cycles include two types of garbage collections, "local garbage collection cycles" (local GC) and "global garbage collection cycles" (global GC). However, it should be understood that other partitioning may be used in association with the present technology without departure from the scope of the present subject matter. Local garbage collection cycles target only a portion of the heap, while global garbage collection cycles target the whole/entire heap. It is understood that the "heap" is a memory area from which dynamic memory allocations are made by applications.

The local GC may alternatively be referred to herein as a "partial garbage collection (PGC) cycle" that collects newly allocated objects and any subset(s) of regions that is(are) expected to yield a large amount of free space. Further, the global GC may be referenced by a "global (concurrent) marking phase" (GMP) followed by a sweep. The sweep targets the whole/entire heap and occurs less frequently than the PGC. Further, it should be understood that, for purposes of the present examples, PGCs may still occur during the GMP.

"Generational garbage collection" refers to a technique of dividing the heap roughly into a "young area" collected by a local GC (but may be collected by a global GC as well) and an "old area." Using the concept of a region-based heap, a local GC may collect arbitrary subsets of regions. Because a live object graph may include cycles that span multiple regions, a global GC may be periodically/occasionally performed.

It should be noted that the present description utilizes occasional occurrences of global GCs to present the examples herein. However, this should not be considered limiting and any suitable scheduling of global GCs may be utilized as appropriate for given implementation.

Regarding scope of granularity, the examples described below utilize region-based granularity as an example of scope. However, it should be understood that the present technology may be implemented at an object-level granularity without departure from the scope of the present subject matter. As such, any suitable granularity as appropriate for a given implementation may be used.

For purposes of the examples described herein, a boundary may be considered to exist and to be managed between young regions and old regions, based upon the respective ages of the young regions and old regions. However, it should be understood that more sophisticated survival rate functions may be utilized and maintained as appropriate for a given implementation, and all such survival rate functions are considered to be within the scope of the present subject matter.

Regarding aging and the survival rate of regions/objects, the examples herein utilize "generational-based garbage collection" (GBGC) and region-based garbage collection (RBGC). GBGC and RBGC collectively keep track of object age within regions.

Regarding region life cycles (or objects within regions if object granularity is used), "aging" or the "age" of regions (or objects) may be driven by various input parameters, such as local GC count (e.g., a PGC count—the number of occurrences of a local GC with one or more objects surviving in the region), time elapsed from creation of a region (or object), bytes allocated to a region (or object), or some other form of life cycle measure as appropriate for a given implementation. The particular low-level mechanism for life cycle measurement may be selected as appropriate for a given implementation, as long as the aging function is monotonically increasing. For purposes of the examples described below that utilize region-based granularity, "region age" is represented using cardinal numbers.

Regarding survival of objects, a "survival rate" may be considered a fraction of objects that survive per unit of time (or per local GC count as applicable). It should be noted that the survival rate of objects may vary at certain ages. For example, younger objects may be considered to have a low survival rate. For purposes of the present examples, garbage collection processing keeps track of information about survival rate. The tracked survival rate information may affect which regions are selected for local GCs.

Regarding criteria for determining whether a region has a high survival rate, as a foundational example, a high survival rate may mean that the region is "old." For example, consider an aging scheme where there are several age groups, such as ages zero (0) through a variable/threshold called "maxAge," and where maxAge is typically a single or double digit cardinal number, (e.g., 0, 1, 2, . . . maxAge). Within the context of this example, a region at maxAge may be considered an old region. Once regions reach the maxAge group, the regions stay in the maxAge group.

Regarding criteria for determining whether a region is "full," it should be noted that in practice, regions are rarely completely full. As such, there may almost always be some level of fragmentation even for de-fragmented regions. Accordingly, to consider a region full for purposes of the examples herein, the actual "emptiness" may be compared with an average observed fragmentation that a compactor/de-fragmenter creates. For example, a region may be considered to be a full region if the emptiness of the region is less than an average emptiness (of de-fragmented regions) plus ("+") a standard deviation of the emptiness.

Another criteria for considering a region as full may be based on the cost of evacuating the region, which may be based upon the occupancy of the region and an amount of time to evacuate (or de-fragment) the region. For purposes of the present description, the "occupancy" of a region may be considered a "fullness" of the region or the relative fullness of the region relative to, for example, the fullness of a de-fragmented region, or may be any quantitative measure of memory allocations within a region as appropriate for a given implementation. For example, if the occupancy of the region (e.g., number of objects) is significantly higher than an average occupancy of evacuated regions, then the region may be considered to be too costly to evacuate and, from that perspective, may be considered to be a full region.

As such, for purposes of the examples described herein, regions may be considered stable in two ways. First, a region may be considered stable by already being full and aging out (e.g., to maxAge). Alternatively, a region may be considered stable by already being old (e.g., at maxAge) and getting merged into a new full region. For example, in a merge operation, a region may be a source (e.g., where objects come from), a destination (e.g., where object go to), or may be both a source and a destination. If a region is only a source, it will be emptied out and as such, cannot be "full." Either pure destination regions (e.g., regions that are empty at a start of a merge operation) or source regions that are also a destination region (e.g., objects from other source regions are moved to this region, but objects of this region also stay in this region) may end up being "full" as a result of the merge operation.

In view of the description above and to reduce complexity of the examples herein, for purposes of the examples that follow, two criteria are utilized to define a region as "stable," though others may be utilized as appropriate for a given implementation. As such, for purposes of the examples that follow, a "stable region" may be defined as a region that is "full" and that has a high survival rate (e.g., is old). Examples of criteria for considering a region as full and as having a high survival rate are described above and in more detail below.

It is also assumed, to reduce complexity of the examples described herein, that newly-created objects are allocated from empty regions, though this aspect may also be changed as appropriate for a given implementation. As such, it is further assumed for purposes of example that garbage collection processing incrementally de-fragments regions to create new empty regions from which to allocate newly-created objects. Regions that are not full, even if they have high survival rate, are candidates for evacuation, and as such may not be considered stable regions due to the potential of evacuation. Additionally, it may be assumed for purposes of the present examples, that a full region is not to be evacuated. It should be noted that, for an implementation of a region-based garbage collector where allocation of objects may be performed from non-empty regions, the stability criteria utilized within the examples herein may be relaxed to look only at the survival rate.

It should be noted that if a region has a sufficient amount of useful free space to be utilized to store additional objects, then the region may still be used as a destination region for evacuation of some other region(s). This may be considered true even if the region's remembered set (RS) is overflowed (described above and in more detail below), because references remembered within a region's RS are only references from outside of this region into this region and they are not used during evacuation if the region is a destination region for the evacuation of another region.

The present technology utilizes the concepts described herein to improve (reduce) maintenance of remembered sets for stable regions. As such, once a region is identified/defined as stable, the region's RS is no longer maintained/rebuilt with the frequency and resultant overhead of non-stable regions. One way to indicate that a region is stable is to put the RS into an overflowed state, though many other possibilities exist for identifying a region as stable and all are considered within the scope of the present subject matter. It should be noted that the present technology utilizes the overflow state to mark the respective regions as stable, and not to indicate excessive size for a region.

Using the present technology, once a stable region's RS is overflowed, no further updates to the stable region's RS are performed until a boundary for rebuilding the RS is reached. The existing content of the stable region's RS may be flushed, and any resources used by RS may be returned to the global resource pool. Subsequent PGCs do not add new references to a stable region's RS. More particularly, the step in the PGC that invalidates stale references, which otherwise would have to visit every RS at every PGC, may now skip this identified stable region. Accordingly, the present technology may considerably reduce maintenance of remembered sets for identified stable regions.

The stable region's RS is rebuilt by the next GMP (or other boundary as appropriate for a given implementation), after which the region is treated as any other region. Thus from the point of rebuilding the RS, the previously-stable region's RS is maintained and the region may be collected by any of the subsequent PGCs, or the region may be put back into an overflowed state if an insufficient percentage of objects do not survive (e.g., the region is again considered stable).

As an alternative approach, a stable region's RS does not have to be overflowed immediately. For example, the PGC may stop invalidating stale and duplicate references, but may still keep adding new ones. In this example, the stable region's RS will keep growing, but will be a super set of an accurate RS. Over time, the stable region's RS may grow so much that it will be overflowed by the other criteria, such as excessive size.

As another variant, a concept of "super-stable regions" may be utilized to further improve/reduce RS maintenance overhead. Super-stable regions may be considered as regions that have had their RS rebuilt multiple times (a configurable number) and remain stable (e.g., an insignificant number of objects do not survive at the GMP or other selected boundary). As such, for a region that has been identified as a super-stable region, rebuilding of the RS for the region may be further deferred for a configurable number of GMP or other selected boundary operations. For example, where an RS for a region has been rebuilt a configurable number of times (e.g., five times) on five global garbage collection cycles with no or insignificant change to its resulting stability, the region may be considered a super-stable region. Once the region is considered a super-stable region, rebuilding of the RS may be deferred for a configurable number of global garbage collection cycles (e.g., ten global cycles). As such, a first configurable super-stable region identification threshold may be defined for considering a region as super stable, and a second configurable remembered set rebuilding threshold may be defined for a new boundary for RS rebuilding for super-stable regions. Accordingly, remembered set maintenance may be further reduced for super-stable regions, and the concept of and alternative processing for super-stable regions may be utilized to further improve/reduce RS maintenance overhead.

The remembered set overhead reduction by deferred garbage collection of stable regions described herein may be performed in real time to allow prompt remembered set overhead reduction by deferring garbage collection of stable regions to reduce remembered set overhead. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for remembered set overhead reduction by deferred garbage collection of stable regions. A computing device_1 102 through a computing device_N 104 communicate via a network 106 with several other devices. The other devices include a server_1 108 through a server_M 110.

As will be described in more detail below in association with FIG. 2 through FIG. 8, the computing device_1 102 through the computing device_N 104 may each provide automated remembered set overhead reduction by deferred garbage collection of stable regions. Additionally, the server_1 108 through the server_M 110 may also each provide automated remembered set overhead reduction by deferred garbage collection of stable regions. The automated remembered set overhead reduction by deferred garbage collection of stable regions is based upon identification of regions as stable, as described above and in more detail below. The automated remembered set overhead reduction by deferred garbage collection of stable regions may be utilized to reduce maintenance of remembered sets for stable regions, as also described above and in more detail below. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
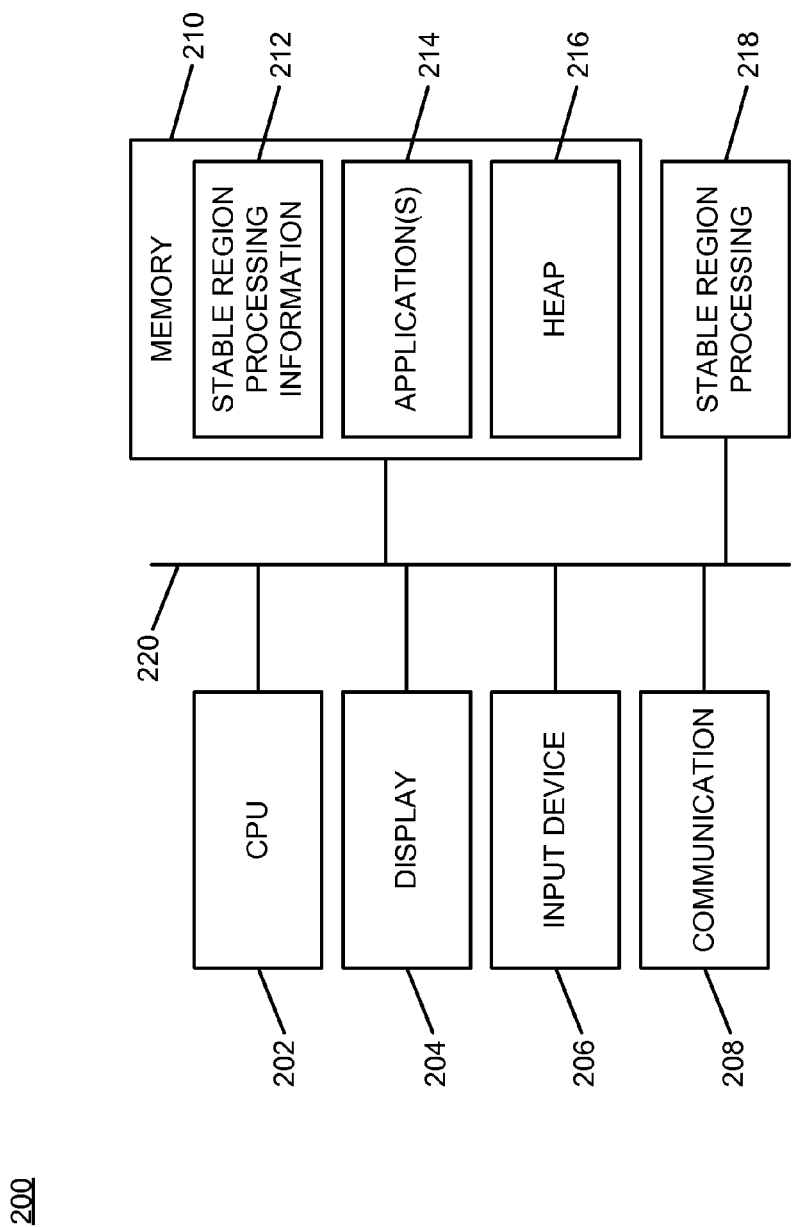
FIG. 2 is a block diagram of an example of an implementation of a core processing module capable of performing remembered set overhead reduction by deferred garbage collection of stable regions according to an embodiment of the present subject matter.

FIG. 2 is a block diagram of an example of an implementation of a core processing module 200 capable of performing remembered set overhead reduction by deferred garbage collection of stable regions. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of remembered set overhead reduction by deferred garbage collection of stable regions in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be considered optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, as appropriate for a given implementation.

A memory 210 includes a stable region processing information storage area 212 that stores configurable criteria for identification of regions as stable and super stable for use by the core processing module 200. For example, the stable region processing information storage area 212 may store aging criteria (e.g., aging counters for regions, configured maxAge value(s), aging increment event trigger(s), etc.) and fullness criteria (e.g., average emptiness of de-fragmented regions, statistical deviation of emptiness, etc.) for identifying regions as stable. The stable region processing information storage area 212 may also store information for identifying regions as super-stable regions (e.g., super-stable region identification thresholds, etc.) and for further deferred processing of RS rebuilding for identified super-stable regions (e.g., remembered set rebuilding threshold, etc.), respectively. The stable region processing information storage area 212 may also store region identification criteria, remembered sets for identified regions, and other information for processing of regions. All variations described above for processing of regions to identify them as stable regions and/or super-stable regions, and for deferral and rebuilding of remembered sets for such regions as described above and in more detail below are considered within the scope of the information that may be stored within the stable region processing information storage area 212 and used for processing of remembered set overhead reduction by deferred garbage collection of stable regions.

The memory 210 also includes an application(s) area 214 that provides for storage and execution of one or more application. A heap storage area 216 provides storage for application memory allocations. The heap storage area 216 may be partitioned into regions based upon region identification criteria. The regions may be processed for garbage collection and remembered set overhead reduction by deferred garbage collection of stable regions.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A stable region processing module 218 is also illustrated. The stable region processing module 218 provides garbage collection and remembered set processing overhead reduction capabilities for the core processing module 200, as described above and in more detail below. The stable region processing module 218 implements the automated remembered set overhead reduction by deferred garbage collection of stable regions of the core processing module 200.

It should also be noted that the stable region processing module 218 may form a portion of other circuitry described without departure from the scope of the present subject matter. Further, the stable region processing module 218 may alternatively be implemented as an application stored within the memory 210. In such an implementation, the stable region processing module 218 may include instructions executed by the CPU 202 for performing the functionality described herein. The CPU 202 may execute these instructions to provide the processing capabilities described above and in more detail below for the core processing module 200. The stable region processing module 218 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the stable region processing module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
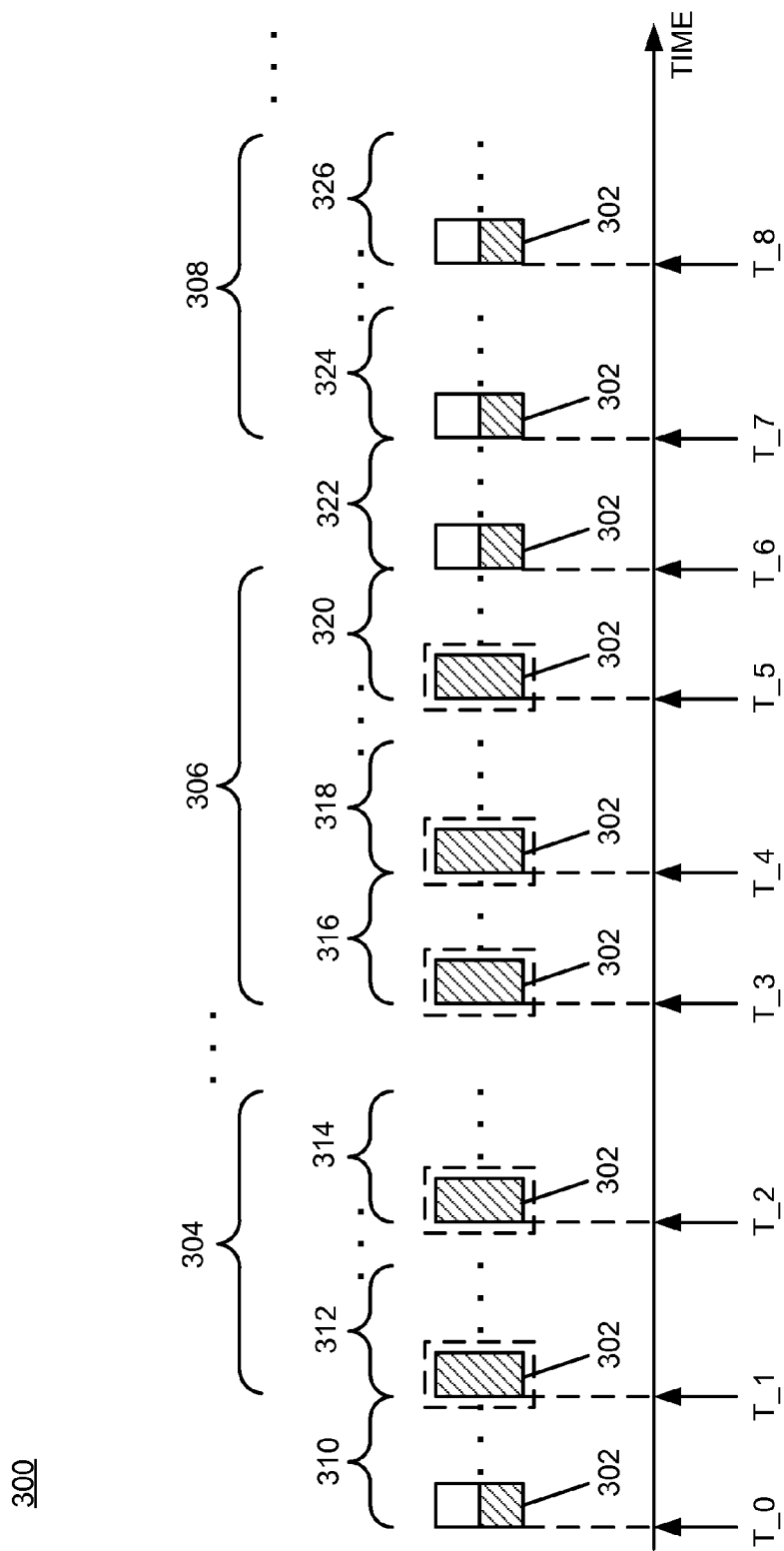
FIG. 3 is a timing diagram of an example of an implementation of a time sequence of remembered set overhead reduction by deferred garbage collection of stable regions according to an embodiment of the present subject matter.

FIG. 3 is a timing diagram of an example of an implementation of a time sequence 300 of remembered set overhead reduction by deferred garbage collection of stable regions associated with the present subject matter. For ease of illustration purposes, a single region 302 of the heap storage area 216 is illustrated within the time sequence 300 across multiple global garbage collection (GGC) cycles labeled as a GGC cycle 304 through a GGC cycle 306, and a GGC cycle 308. It should be noted that global garbage collection may be performed at a frequency/periodicity/time as appropriate to resolve low free-memory issues. Additionally, the amount of time consumed by global garbage collection may vary depending upon the amount of work performed to free memory. As such, the duration of the respective GGC cycle 304 through the GGC cycle 308 is shown to vary within FIG. 3. It should further be noted that global garbage collection is not always active. For example, there may be PGCs that are outside of or inside a GMP. Typically, a GMP may be active for only a fraction of processing time (e.g., ten percent (10%), but may be any percentage as appropriate for a given implementation and application workload).

It should additionally be noted that while the single region 302 is illustrated and described in more detail below, the present example may be applied to all regions within a heap that is to be processed by garbage collection operations. It should additionally be noted that one example of garbage collection operations that are represented by the respective global garbage collection cycles may include a global marking phase (GMP) followed by a sweep (e.g., mark and sweep processing).

Within each global garbage collection cycle, multiple local/partial garbage collection (PGC) cycles are illustrated for purposes of example. Additionally, certain PGC cycles are illustrated to occur outside of global garbage collection cycles. For example, the PGC cycle 310 is illustrated to occur before the beginning of the GGC cycle 304. For the GGC cycle 304, the partial garbage collection cycles are labeled PGC cycle 312 through PGC cycle 314. For the GGC cycle 306, the partial garbage collection cycles are labeled PGC cycle 316 and PGC cycle 318 through PGC cycle 320. The PGC cycle 322 is illustrated to occur after the GGC cycle 306 and before the beginning of the GGC cycle 308. For the GGC cycle 308, the partial garbage collection cycles are labeled PGC cycle 324 through PGC cycle 326. It should be noted that the arrangement of global and partial garbage collection cycles within the present example is for purposes of description only and timing and overlap of the respective cycles may be selected as appropriate for a given implementation.

Each of the local/partial garbage collection (PGC) cycles is illustrated to begin at a time relative to a start time (T_0), though any timing appropriate for a given implementation may be used. As such, within FIG. 3, each of the partial garbage collection cycles 310 through 326 are illustrated to begin at a time incremented by one (1) through a time (T_8) relative to the start time (T_0). It should be noted that the relative times are illustrated and described generally, and may be selected as appropriate for any given implementation.

For purposes of the present example, it is assumed that the region 302 is not initially considered to be a stable region. As described above, a region may be considered stable based upon an age criterion and a fullness/occupancy criterion. Within the description above, an example of an age criterion may be referenced as "maxAge." Similarly, an example of a fullness/occupancy criterion may be occupancy (e.g., fullness) within a statistical deviation of a configured occupancy level for designation of regions as full across multiple global garbage collection cycles. It should be understood that other criteria may be utilized as appropriate for a given implementation and all are considered within the scope of the present subject matter.

Using the example criteria above, within the time sequence 300 the region 302 is represented as not currently considered to be a stable region by being illustrated to be partially crosshatched (e.g., not fully occupied and/or not at a maximum age) within the PGC cycle 310. Because the region 302 is not considered yet to be a stable region within the PGC cycle 310, the remembered set (RS) for the region 302 is rebuilt during the PGC cycle 310. Rebuilding of the remembered set for the region 302 may be performed during any partial garbage collection cycle for which the region 302 is not yet considered to be a stable region.

For purposes of the present example, is assumed that during the PGC cycle 312 the region 302 is determined to be a stable region based upon age and occupancy criteria, as described above and in more detail below. As such, within the PGC cycle 312, the region 302 is represented/marked as a stable region by being illustrated to be fully crosshatched and enclosed within a dashed line. As described above, a region may be marked as stable in any manner, such as by use of a register bit, variable, overflow bit for the remembered set (RS) of a region, or otherwise as appropriate for a given implementation. Because the region 302 is now considered to be a stable region, remembered set overhead may be reduced by deferring garbage collection for the stable region 302. As such, the region 302 may be excluded from partial garbage collection considerations. Accordingly, it is understood that for each partial garbage collection cycle during which the region 302 is illustrated to be marked as stable (i.e., fully crosshatched and enclosed within a dashed line), remembered set overhead and processing for partial garbage collection may be skipped. However, as described above, the remembered set for a stable region may be rebuilt at every global garbage collection cycle between the GGC cycle 304 and the GGC cycle 306, as represented by the ellipsis dots between the respective cycles. It should further be noted that where the remembered set is rebuilt during a particular global garbage collection cycle, as long as the respective region remains stable, remembered set rebuilding and partial garbage collection may be skipped for the respective stable region.

As a result, and as depicted within the GGC cycle 306, the region 302 remains stable and, though the remembered set is rebuilt during the GGC cycle 306, the region 302 may be excluded from partial garbage collection activities until a change of status occurs. Due to space limitations within the drawing figure, the GGC cycle 306 will be reused in a different variant on the present example below.

Regarding super stability of regions, as described above and in more detail below, configurable thresholds may be established to identify stable regions as super-stable regions across multiple global garbage collection cycles. As such, for purposes of the present example, is assumed that the region 302 has been identified as a super-stable region during some global garbage collection cycle between GGC cycle 304 and the beginning of GGC cycle 306. Rebuilding of the remembered set may also be skipped for any GGC cycle after identification of the region 302 as a super-stable region through the GGC cycle 306 in addition to skipping consideration of the region 302 for remembered set rebuilding or garbage collection during the PGC cycles 316, 318 through 320, or until the region 302 is no longer super stable. Accordingly, remembered set overhead may be further reduced for super-stable regions by also deferring rebuilding of remembered sets for super-stable regions within global garbage collection cycles in addition to excluding the region 302 from partial garbage collections during partial garbage collection cycles.

Continuing with the present example, is assumed that a configured number of global garbage collection cycles have passed for the super-stable region 302 as a result of the GGC cycle 306, and that garbage collection including rebuilding of the remembered set for the region 302 is performed during the PGC cycle 322. It is further assumed that occupancy of the region 302 has fallen below a statistical deviation from a configured occupancy level for full regions due to the garbage collection activities. As such, the stable status of the region 302 is removed and the region 302 is again depicted as a non-stable region (i.e., partial crosshatching and an absence of the dashed line enclosure) beginning within the PGC cycle 322. The region 302 continues to be considered a non-stable region during the PGC cycles 324 through 326 of the GGC cycle 308 within the present example.

It should be understood that the present example utilizes an occupancy change to designate the region 302 as non-stable. As such, the age of the region 302 may be maintained until the region 302 is completely evacuated and emptied. However, it should be noted that other variations are possible as appropriate for a given implementation and all are considered within the scope of the present subject matter.

As such, the time sequence 300 illustrates use of example criteria for designating regions as stable regions, and for further designating regions as super-stable regions. The time sequence 300 further illustrates processing for determining that a configured number of global garbage collection cycles of super stability have elapsed to cause garbage collection, including remembered set rebuilding, to occur for super-stable regions. Many additional variations associated with stable region processing and super-stable region processing are possible, and all are considered within the scope of the present subject matter.

FIG. 4 through FIG. 8 described below represent example processes that may be executed by devices, such as the core processing module 200, to perform the remembered set overhead reduction by deferred garbage collection of stable regions associated with the present subject matter. Many other variations on the example processes are possible and all are considered within the scope of the present subject matter. The example processes may be performed by modules, such as the stable region processing module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 4:
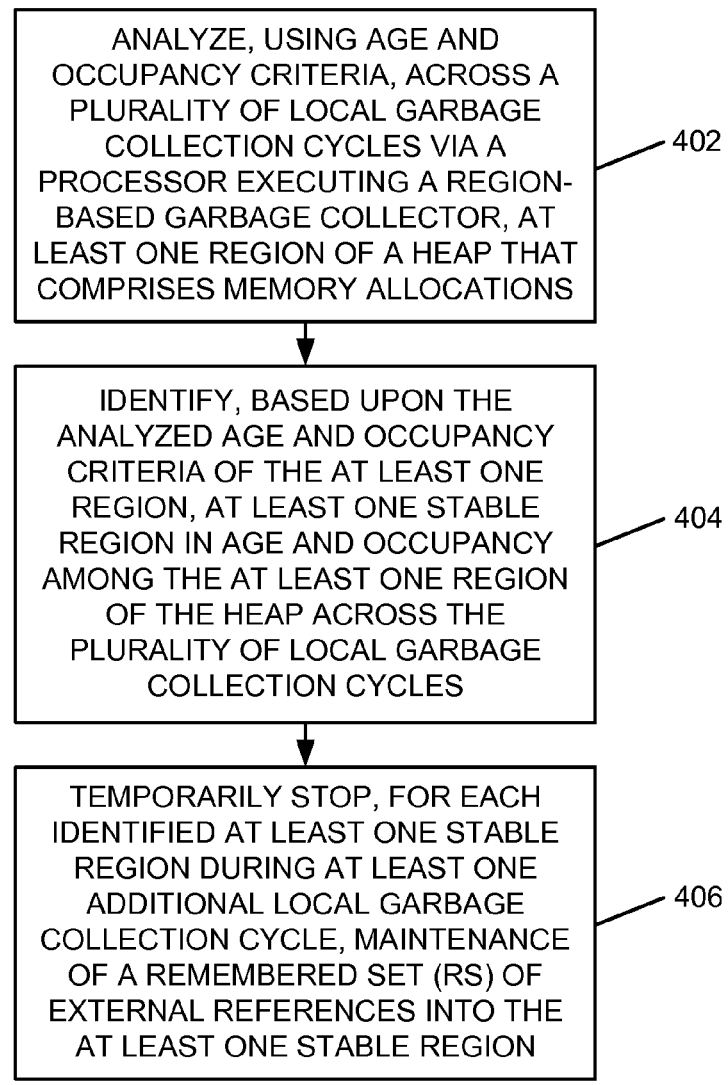
FIG. 4 is a flow chart of an example of an implementation of a process for remembered set overhead reduction by deferred garbage collection of stable regions according to an embodiment of the present subject matter.

FIG. 4 is a flow chart of an example of an implementation of a process 400 for remembered set overhead reduction by deferred garbage collection of stable regions. At block 402, the process 400 analyzes, using age and occupancy criteria, across a plurality of local garbage collection cycles via a processor executing a region-based garbage collector, at least one region of a heap that comprises memory allocations. At block 404, the process 400 identifies, based upon the analyzed age and occupancy criteria of the at least one region, at least one stable region in age and occupancy among the at least one region of the heap across the plurality of local garbage collection cycles. At block 406, the process 400 temporarily stops, for each identified at least one stable region during at least one additional local garbage collection cycle, maintenance of a remembered set (RS) of external references into the at least one stable region.

Figure 5:
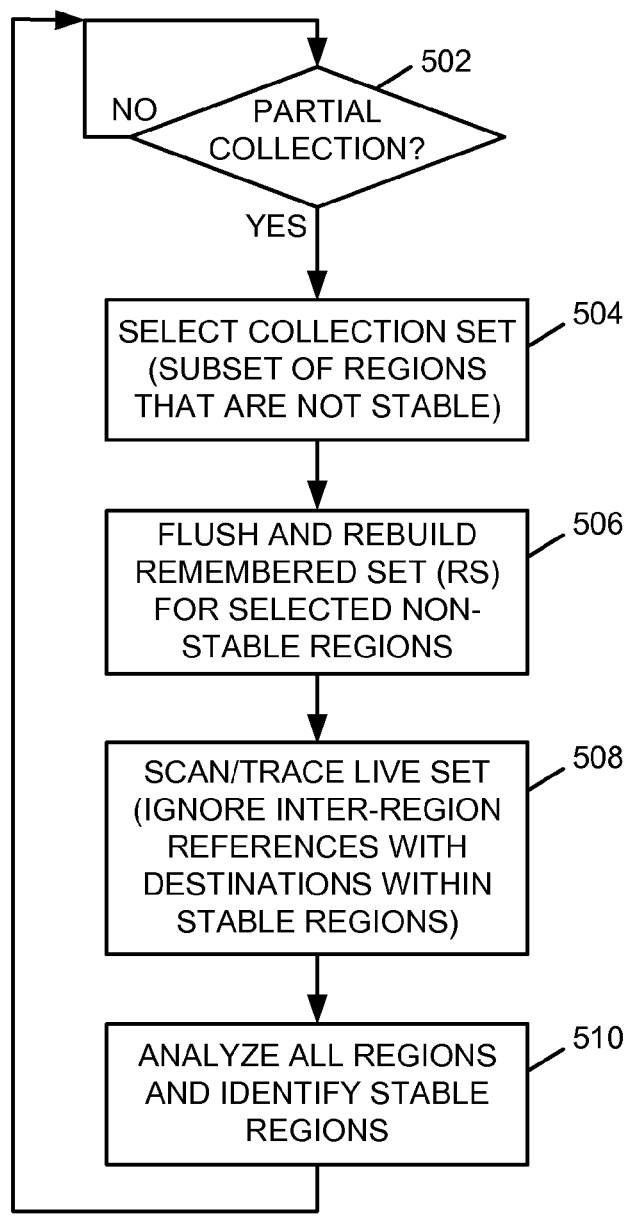
FIG. 5 is a flow chart of an example of an implementation of a higher-level process for remembered set processing during local/partial garbage collection cycles associated with remembered set overhead reduction by deferred garbage collection of stable regions according to an embodiment of the present subject matter.

FIG. 5 is a flow chart of an example of an implementation of a higher-level process 500 for remembered set processing during local/partial garbage collection cycles associated with remembered set overhead reduction by deferred garbage collection of stable regions. It should be noted that the example process 500 details processing for remembered sets and omits certain local garbage collection processing activities to reduce complexity of the drawing and description. As such, the process 500 may be considered to represent a portion of local/partial garbage collection cycle processing. It should also be noted that the process 500 is described utilizing region-level processing. However, it should be noted that object-level processing may be performed without departure from the scope of the present subject matter.

At decision point 502, the process 500 makes a determination as to whether a local/partial garbage collection (PGC) cycle has been initiated. It should be noted that the process 500 is described to start at a local or partial garbage collection boundary for ease of description purposes, and that any other boundary or event may be utilized to initiate processing within the process 500 as appropriate for a given implementation. In response to determining that a local/partial garbage collection (PGC) cycle has been initiated, the process 500 selects a collection set of regions to analyze at block 504. The collection set includes a subset of existing regions that have not been identified as stable regions. As such, the process 500 skips or temporarily stops garbage collection activities for stable regions. It is understood that the collection set of regions form at least a portion of a heap that includes memory allocations by executing applications.

At block 506, the process 500 flushes and rebuilds the remembered set (RS) for each selected non-stable region of the collection set. As such, maintenance of the remembered set (RS) for stable regions is omitted from partial garbage collection processing.

At block 508, the process 500 performs a scan/trace from the live set of objects within the selected non-stable regions. The scan/trace processing may include identifying inter-region references and adding them to the remembered sets. However, as part of the remembered set overhead reduction, inter-region references with destinations within stable regions are ignored. It should be noted that new regions may be created in association with the processing at block 508. Additionally, occupancy of regions may change and some regions may become full as described above.

At block 510, the process 500 analyzes all regions and identifies regions that have become stable regions as a result of the processing described above. It should be noted that newly-identified stable regions may be flagged/marked as stable in any manner appropriate for a given implementation. For example, a register bit or software flag/variable may be associated with each region and the respective identifier may be set (or cleared as appropriate for a given implementation) to identify a region as stable. Additionally/alternatively, an overflow bit of a remembered set (RS) of a region may be utilized as described herein to identify the region as a stable region. Where the overflow bit of the remembered set is utilized to identify a region as stable, the overflow bit may have a multi-tasked purpose in association with other reasons for the overflow bit being set, such as excessive size of the remembered set itself. Processing to either differentiate or not differentiate the use of the overflow bit to identify regions as stable regions may be implemented as appropriate for a given implementation. In response to analyzing all regions and identifying stable regions at block 510, the process 500 returns to decision point 502 and iterates as described above.

As such, the process 500 performs partial garbage collection of a heap by selecting the collection set that is a subset of non-stable regions. The process 500 performs a scan/trace of the live set of objects for all regions except for stable regions. Accordingly, stable regions may be excluded from garbage collection, and maintenance of the remembered set for stable regions may be omitted. Additionally, the process 500 may temporarily terminate admission of new external references into stable region remembered sets, and may skip invalidation of stale references within the remembered sets. As described above, it should be noted that, while the present example omits certain local garbage collection activities, these activities are considered to form a portion of the process 500 and all such activities are considered within the scope of the present subject matter. Processing associated with block 510 for identification of stable regions is described in more detail below in association with FIG. 6.

Figure 6:
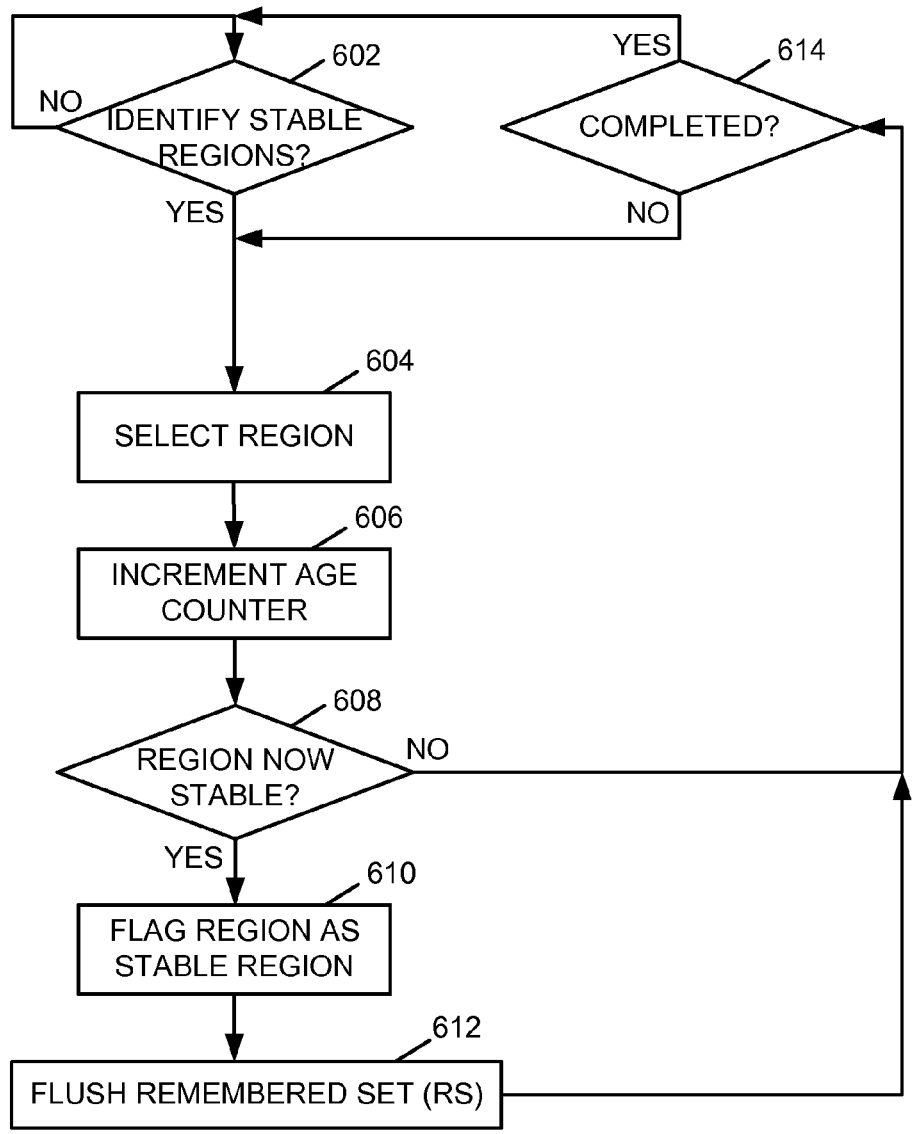
FIG. 6 is a flow chart of an example of an implementation of additional detailed processing associated with the process of FIG. 5 represented for convenience as a sub-process for remembered set processing during local/partial garbage collection cycles associated with remembered set overhead reduction by deferred garbage collection of stable regions according to an embodiment of the present subject matter.

FIG. 6 is a flow chart of an example of an implementation of additional detailed processing associated with the process 500 of FIG. 5 represented for convenience as a sub-process 600 for remembered set processing during local/partial garbage collection cycles associated with remembered set overhead reduction by deferred garbage collection of stable regions. At decision point 602, the process 600 makes a determination as to whether a request to identify stable regions been initiated, such as in association with block 510 of the process 500 of FIG. 5. It should be noted that the processing associated with block 510 of the process 500 of FIG. 5 and the process 600 apply to all regions, such that age (possibly a configured maxAge) and occupancy criteria are applied to all regions. In response to determining that a request to identify stable regions has been initiated, the process 600 selects a region to analyze at block 604.

The process 600 increments an age counter for the selected region at block 606. As described above, and more detail below, age and occupancy criteria may be utilized to identify and designate regions as stable regions. For each identified stable region, maintenance of the remembered set (RS) of external references into the stable region may be temporarily stopped during at least one additional local/partial garbage collection cycle, until the remembered set is rebuilt.

As such, at decision point 608, the process 600 makes a determination as to whether the selected region is stable based upon the incremented age counter and an occupancy level of objects within the selected region. As described above, an aging scheme that utilizes a variable/threshold, such as "maxAge" may be utilized to determine whether the age of the region has reached a threshold level for consideration as a stable region. Additionally, occupancy of a region may be considered a fullness of the region or relative fullness of the region relative to, for example, fullness of a de-fragmented region, or may be any quantitative measure of memory allocations within a region as appropriate for a given implementation. As described above, because non-full regions may be subjected to evacuation, the two criteria of age and occupancy level (fullness) provide a reliable measurement criteria set that may be utilized to designate regions as stable regions within the present examples, though other criteria may be utilized as appropriate for a given implementation.

In response to determining at decision point 608 that the selected region is currently (now) stable, the process 600 flags the region as a stable region at block 610. For example, the process 600 may set (or clear) a register bit or variable associated with the region, or may place the remembered set (RS) of the identified stable region into an overflow state, as appropriate for a given implementation. Marking the region as a stable region allows temporary termination/stopping of maintenance for the remembered set (RS) of the identified stable region.

Temporary termination of maintenance for the remembered set of stable regions may include flushing, for each identified stable region, existing content of the remembered set (RS). Resources previously used by the remembered set (RS) may be returned to a global resource pool. Temporary termination of maintenance for the remembered set of stable regions may also include temporarily terminating addition of new external references into at least one stable region to the remembered set (RS) during at least one additional local garbage collection cycle. Temporary termination of maintenance for the remembered set of stable regions may further include skipping invalidation of stale references within the remembered set. It is understood that one or more of the previous options may be utilized as appropriate for a given implementation. As such, additional local/partial garbage collection cycles may ignore maintenance of the remembered set (RS) of the identified stable region until the remembered set is rebuilt, such as during a global garbage collection cycle, in response to recognition of the overflow state of the remembered set (RS) of the stable region.

In response to marking the region as a stable region at block 610, the process 600 flushes the remembered set (RS) and returns the resources to the global resource pool at block 612. In response to flushing the remembered set and returning the resources to the global resource pool at block 612, the process 600 skips remembered set maintenance for the selected stable region and makes a determination at decision point 614 as to whether processing for the identification of stable regions in association with the local/partial garbage collection cycle has been completed. In response to determining at decision point 614 that processing for the identification of stable regions in association with the local/partial garbage collection cycle has not been completed, the process 600 returns to block 604 to select the next region of the heap and iterates as described above to select and process additional regions until all regions have been processed. In response to determining at decision point 614 that processing for the identification of stable regions in association with the local/partial garbage collection cycle has been completed, the process 600 returns to decision point 602 and iterates as described above.

As such, the process 600 iteratively processes regions of a heap as part of a local/partial garbage collection operation to identify new stable regions. As described above, remembered set maintenance may be skipped for regions that have already been identified as stable or that are identified during any iteration as stable. Remembered sets may be flushed as regions are identified as stable regions.

Figure 7:
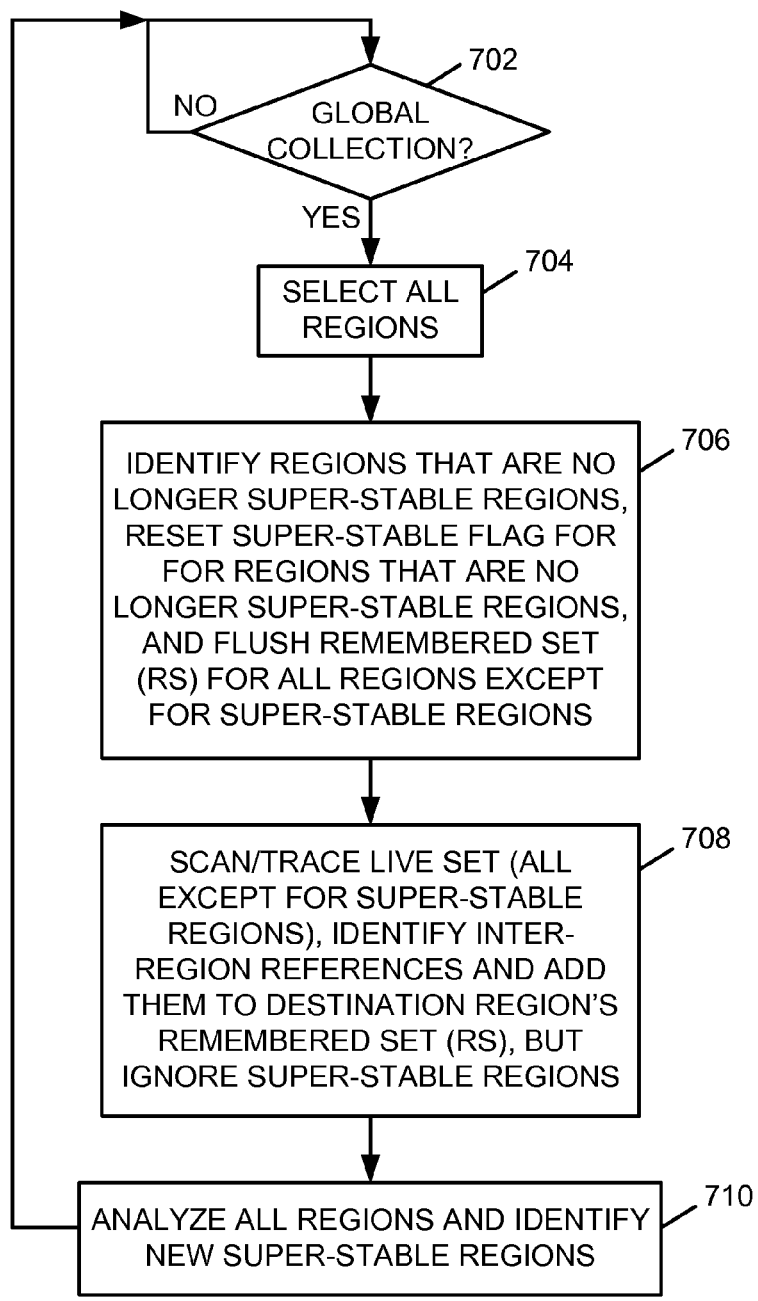
FIG. 7 is a flow chart of an example of an implementation of a higher-level process for remembered set processing during global garbage collection cycles associated with remembered set overhead reduction by deferred garbage collection of stable regions according to an embodiment of the present subject matter.

FIG. 7 is a flow chart of an example of an implementation of a higher-level process 700 for remembered set processing during global garbage collection cycles associated with remembered set overhead reduction by deferred garbage collection of stable regions. It should be noted that the example process 700 details processing for remembered sets and omits certain global garbage collection processing activities to reduce complexity of the drawing and description. As such, the process 700 may be considered to represent a portion of global garbage collection cycle processing. It should also be noted, the process 700 is described utilizing region-level processing. However, it should be noted that object-level processing may be performed without departure from the scope of the present subject matter.

At decision point 702, the process 700 makes a determination as to whether a global garbage collection (GGC) cycle has been initiated. It should be noted that the process 700 is described to start at a global garbage collection boundary for ease of description purposes, and that any other boundary or event may be utilized to initiate processing within the process 700 as appropriate for a given implementation. In response to determining that a global garbage collection (GGC) cycle has been initiated, the process 700 selects all regions to analyze at block 704. It is understood that the selected regions form at least a portion of a heap that includes memory allocations by executing applications.

At block 706, the process 700 identifies regions that are no longer super-stable regions, resets the super-stable flag/marker for any regions that are no longer super-stable regions, clears the stable region flag/marker and/or super-stable region counter for the respective regions that are no longer super-stable regions, and flushes the remembered set (RS) for all regions except for super-stable regions. With respect to identifying regions that are no longer super-stable, the process 700 may, for example, make a determination as to whether a configured remembered set rebuilding threshold count has been met. As described above, for regions that have been identified as super-stable regions, a configurable remembered set rebuilding threshold may be defined for a new boundary for RS rebuilding for super-stable regions. As such, remembered set maintenance may be further reduced for super-stable regions, and the concept of and alternative processing for super-stable regions may be utilized to further improve/reduce RS maintenance overhead. Further, the process 700 may defer rebuilding of the remembered set (RS) of the designated super-stable region for a configured number of global garbage collection cycles. It should be noted that super-stable regions and stable regions may be flagged/marked as super-stable and stable, respectively, in any manner appropriate for a given implementation. For example, a register bit or software flag/variable may be associated with each region and the respective identifier may be set (or cleared as appropriate for a given implementation) to identify a region as super-stable or stable, respectively. Additionally/alternatively, an overflow bit of a remembered set (RS) of a region may be utilized as described herein to identify the region as a stable region. Where the overflow bit of the remembered set is utilized to identify a region as stable, the overflow bit may have a multi-tasked purpose in association with other reasons for the overflow bit being set, such as excessive size of the remembered set itself. Processing to either differentiate or not differentiate the use of the overflow bit to identify regions as stable regions may be implemented as appropriate for a given implementation.

At block 708, the process 700 performs a scan/trace from the live set of objects for all regions except for super-stable regions. The scan/trace processing may include identifying inter-region references and adding them to the remembered sets. However, as part of the remembered set overhead reduction, inter-region references with destinations within super-stable regions are ignored. It should be noted that no new regions are created in association with the processing at block 708. Additionally, occupancy of regions may change and some regions may become full as described above.

At block 710, the process 700 analyzes all regions and identifies new super-stable regions. For example, the process 700 may, for example, determine that a stable region has remained within a statistical deviation of a configured occupancy level for a designation of regions as full across multiple global garbage collection cycles and/or may determine that a stable region has had a low invalidation rate of objects across the plurality of global garbage collection cycles. The process 700 may additionally evaluate a count value of a super-stable region identification count that is incremented as described in more detail below, and may determine whether a configurable super-stable region identification threshold has been met or exceeded. In response to analyzing all regions and identifying super-stable regions at block 710, the process 700 returns to decision point 702 and iterates as described above.

As such, the process 700 performs global garbage collection of a heap by selecting all regions. The process 700 flushes remembered sets for all regions except for super-stable regions and identifies previously-identified super-stable regions that are no longer super-stable. The process 700 performs a scan/trace of the live set of objects for all regions except for super-stable regions. Accordingly, super-stable regions may be excluded from garbage collection, and maintenance of the remembered set for super-stable regions may be omitted. Additionally, the process 700 may temporarily terminate admission of new external references into stable region remembered sets, and may skip invalidation of stale references within the remembered sets. As described above, it should be noted that, while the present example omits certain global garbage collection activities, these activities are considered to form a portion of the process 700 and all such activities are considered within the scope of the present subject matter. Processing associated with block 710 for identification of super-stable regions is described in more detail below in association with FIG. 8.

Figure 8:
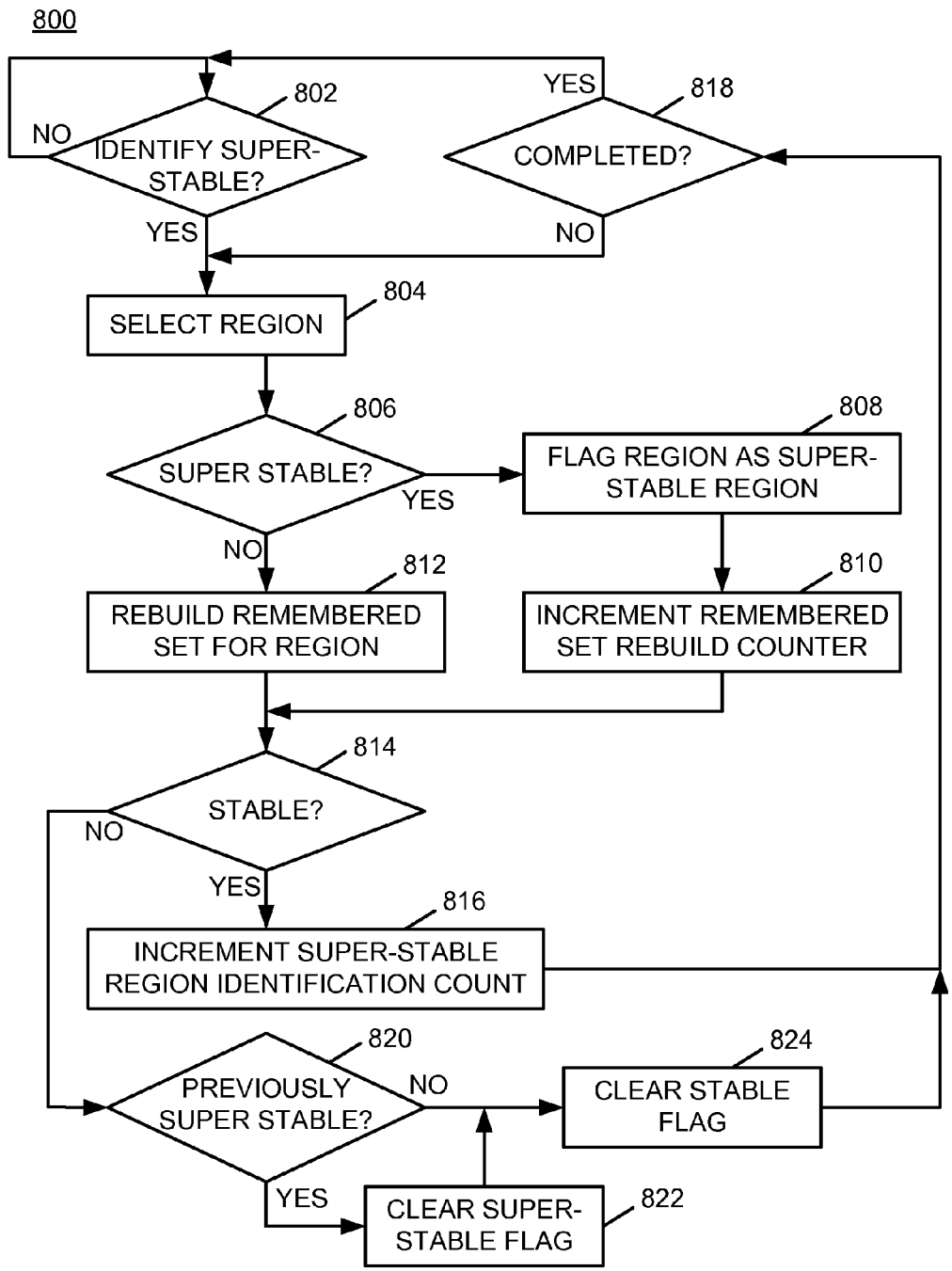
FIG. 8 is a flow chart of an example of an implementation of additional detailed processing associated with the process of FIG. 7 represented for convenience as a sub-process for remembered set processing during global garbage collection cycles associated with remembered set overhead reduction by deferred garbage collection of stable regions according to an embodiment of the present subject matter.

FIG. 8 is a flow chart of an example of an implementation of additional detailed processing associated with the process 700 of FIG. 7 represented for convenience as a sub-process 800 for remembered set processing during global garbage collection cycles associated with remembered set overhead reduction by deferred garbage collection of stable regions. At decision point 802, the process 800 makes a determination as to whether a request to identify super-stable regions has been initiated. In response to determining that a request to identify super-stable regions has been initiated, the process 800 selects a region to analyze at block 804. It is understood that the selected region, along with other selected regions, form at least a portion of a heap that includes memory allocations by executing applications.

At decision point 806, the process 800 makes a determination as to whether the selected region is a super-stable region. In response to determining that the selected region is a super-stable region, the process 800 flags the region as a super-stable region at block 808. As such, the process 800 may determine, across multiple global garbage collection cycles, that a stable region has remained stable over a configurable number of global garbage collection cycles. In response to such a determination, the process 800 may designate/flag the stable region that has remained stable over the configurable number of global garbage collection cycles as a super-stable region. The process 800 increments a remembered set rebuild counter for the super-stable region at block 810.

Returning to the description of decision point 806, in response to determining that the selected region is not a super-stable region, the process 800 rebuilds the remembered set for the selected region at block 812. Rebuilding of the remembered set may include adding new external references into at least one stable region to the remembered set (RS), and invalidating stale references within the remembered set. It should additionally be understood that additional processing for other garbage collection functions are also considered to form a portion of the processing at block 812, as appropriate for the given implementation. It should further be noted that the selected region may have a status of stable or non-stable, and that the remembered set may be rebuilt regardless of the respective stability status for the selected region. As such, the remembered set (RS) of a stable region may be rebuilt during a next global marking phase of a global garbage collection cycle.

In response to rebuilding the remembered set (RS) for the selected region at block 812, or in response to incrementing the remembered set rebuild counter for the super-stable region at block 810, the process 800 makes a determination at decision point 814 as to whether the selected region is stable after garbage collection processing for the selected region and rebuilding of the remembered set for the selected region. As described above, regions that have had their RS rebuilt multiple times (a configurable number) and remain stable (e.g., an insignificant number of objects are removed/expire at the GMP or other selected boundary) may be considered candidates for super-stable region identification. As such, in response to determining at decision point 814 that the region is still stable after garbage collection processing, the process 800 increments a super-stable region identification count at block 816. It is a counter such as this super-stable region identification count that may be evaluated for determining super stability of selected regions, as described above.

In response to incrementing the super-stable region identification count at block 816, the process 800 makes a determination as to whether the global garbage collection cycle is completed at decision point 818. In response to determining that processing for the global garbage collection cycle has been completed, the process 800 returns to decision point 802 and iterates as described above. In response to determining that processing for the global garbage collection cycle has not been completed, the process 800 returns to block 804 to select the next region of the heap and iterates as described above.

Returning to the description of decision point 814, in response to determining that the selected region for which the remembered set was rebuilt is not a stable region (e.g., no longer stable due to garbage collection processing or was not initially stable), the process 800 makes a determination at decision point 820 as to whether the region was previously identified/flagged as a super-stable region. In response to determining that region was previously identified/flagged as a super-stable region, the process 800 clears a super-stable flag for the region at block 822. In response to clearing the super-stable flag at block 822, or in response to determining that the region was not previously identified/flagged as a super-stable region at decision point 820, the process 800 clears a stable flag for the region at block 824. The process 800 returns to decision point 818 and iterates as described above until processing for the global garbage collection cycle is completed, at which time the process 800 returns to decision point 802.

It should be noted that the stable flag that is cleared at block 824 may, for example, be the flag set at block 610 of the process 600 described above to initially identify the region as stable. Accordingly, the process 600 of FIG. 6 and the process 800 of FIG. 8 may be combined, as described above, into the same process, or may operate as separate processes that interact via flags (e.g., variables) or register-based communications as appropriate for a given implementation.

As such, the process 800 operates during global garbage collection cycles, such as during a global marking phase (GMP) of a mark and sweep global garbage collection processing mechanism, to identify regions as super-stable regions. Remembered set rebuilding for identified super-stable regions may be further deferred based upon a configurable number of global garbage collection cycles during which the respective region remains super stable. Upon expiration of the respective threshold for rebuilding remembered sets for super-stable regions, the process 800 rebuilds the remembered set for the region and performs additional processing to again consider the selected regions for super stability and/or remove indications of super stability or stability based upon the stability of the region after garbage collection.

As described above in association with FIG. 1 through FIG. 8, the example systems and processes provide remembered set overhead reduction by deferred garbage collection of stable regions. Many other variations and additional activities associated with remembered set overhead reduction by deferred garbage collection of stable regions are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a memory; and
a processor that executes a region-based garbage collector and is programmed to:
analyze, using age and occupancy criteria, across a plurality of local garbage collection cycles, at least one region of a heap within the memory that comprises memory allocations;
identify, based upon the analyzed age and occupancy criteria of the at least one region, at least one stable region in age and occupancy among the at least one region of the heap across the plurality of local garbage collection cycles;
temporarily stop, for each identified at least one stable region during at least one additional local garbage collection cycle, maintenance of a remembered set (RS) of external references into the at least one stable region;
determine, across a plurality of global garbage collection cycles, that one of the at least one stable region has remained stable across a configured number of global garbage collection cycles; and
designate the one of the at least one stable region that has remained stable across the configured number of global garbage collection cycles as a super-stable region;
where, in being programmed to determine, across the plurality of global garbage collection cycles, that the one of the at least one stable region has remained stable across the configured number of global garbage collection cycles the processor is programmed to one of:
determine that occupancy of the one of the at least stable region has remained within a statistical deviation of a configured occupancy level for designation of regions as full across the plurality of global garbage collection cycles; and
determine that the one of the at least stable region has had a low invalidation rate of objects across the plurality of global garbage collection cycles.

2. The system of claim 1, where, in being programmed to temporarily stop, for each identified at least one stable region during the at least one additional local garbage collection cycle, maintenance of the remembered set (RS) of the external references into the at least one stable region, the processor is programmed to:
place the remembered set (RS) of each of the at least one stable region into an overflow state; and
where the at least one additional local garbage collection cycle ignores maintenance of the remembered set (RS) of each of the at least one stable region in response to recognition of the overflow state of the remembered set (RS) of the at least one stable region.

3. The system of claim 1, where, in being programmed to temporarily stop, for each identified at least one stable region during the at least one additional local garbage collection cycle, maintenance of the remembered set (RS) of the external references into the at least one stable region, the processor is programmed to at least one of:
flush, for each identified at least one stable region, existing content of the remembered set (RS), where resources used by the remembered set (RS) are returned to a global resource pool;
temporarily terminate addition of new external references into the at least one stable region to the remembered set (RS) during the at least one additional local garbage collection cycle; and
skip invalidation of stale references within the remembered set.

4. The system of claim 1, where the processor is further programmed to rebuild the remembered set (RS) of the at least one stable region during a next global marking phase of a global garbage collection cycle.

5. The system of claim 1, where the processor is further programmed to defer rebuilding of the remembered set (RS) of the designated super-stable region for the configured number of global garbage collection cycles.

6. The system of claim 5, where the processor is further programmed to rebuild the remembered set (RS) of the designated super-stable region in response to expiration of the configured number of global garbage collection cycles.

7. A computer program product, comprising: a computer readable storage memory having computer readable program code embodied therewith, where the computer readable program code when executed on a computer causes the computer to execute a region-based garbage collector and to:
analyze, using age and occupancy criteria, across a plurality of local garbage collection cycles, at least one region of a heap that comprises memory allocations;
identify, based upon the analyzed age and occupancy criteria of the at least one region, at least one stable region in age and occupancy among the at least one region of the heap across the plurality of local garbage collection cycles;
temporarily stop, for each identified at least one stable region during at least one additional local garbage collection cycle, maintenance of a remembered set (RS) of external references into the at least one stable region;
determine, across a plurality of global garbage collection cycles, that one of the at least one stable region has remained stable across a configured number of global garbage collection cycles; and
designate the one of the at least one stable region that has remained stable across the configured number of global garbage collection cycles as a super-stable region;
where in causing the computer to determine, across the plurality of global garbage collection cycles, that the one of the at least one stable region has remained stable across the configured number of global garbage collection cycles, the computer readable program code when executed on the computer causes the computer to one of:
determine that occupancy of the one of the at least stable region has remained within a statistical deviation of a configured occupancy level for designation of regions as full across the plurality of global garbage collection cycles; and
determine that the one of the at least stable region has had a low invalidation rate of objects across the plurality of global garbage collection cycles.

8. The computer program product of claim 7, where in causing the computer to temporarily stop, for each identified at least one stable region during the at least one additional local garbage collection cycle, maintenance of the remembered set (RS) of the external references into the at least one stable region, the computer readable program code when executed on the computer causes the computer to:
place the remembered set (RS) of each of the at least one stable region into an overflow state; and
where the at least one additional local garbage collection cycle ignores maintenance of the remembered set (RS)

of each of the at least one stable region in response to recognition of the overflow state of the remembered set (RS) of the at least one stable region.

9. The computer program product of claim 7, where in causing the computer to temporarily stop, for each identified at least one stable region during the at least one additional local garbage collection cycle, maintenance of the remembered set (RS) of the external references into the at least one stable region, the computer readable program code when executed on the computer causes the computer to at least one of:

flush, for each identified at least one stable region, existing content of the remembered set (RS), where resources used by the remembered set (RS) are returned to a global resource pool;

temporarily terminate addition of new external references into the at least one stable region to the remembered set (RS) during the at least one additional local garbage collection cycle; and skip invalidation of stale references within the remembered set.

10. The computer program product of claim 7, where the computer readable program code when executed on the computer further causes the computer to rebuild the remembered set (RS) of the at least one stable region during a next global marking phase of a global garbage collection cycle.

11. The computer program product of claim 7, where the computer readable program code when executed on the computer further causes the computer to defer rebuilding of the remembered set (RS) of the designated super-stable region for the configured number of global garbage collection cycles.

12. The computer program product of claim 11, where the computer readable program code when executed on the computer further causes the computer to rebuild the remembered set (RS) of the designated super-stable region in response to expiration of the configured number of global garbage collection cycles.

* * * * *